Aug. 2, 1955    P. B. RICHARDSON    2,714,472
WEIGHING APPARATUS
Filed Nov. 17, 1950    6 Sheets-Sheet 1

INVENTOR
Philip B. Richardson,
BY
ATTORNEYS

United States Patent Office 2,714,472
Patented Aug. 2, 1955

2,714,472

WEIGHING APPARATUS

Philip B. Richardson, Montclair, N. J., assignor to Richardson Scale Company, Clifton, N. J., a corporation of New Jersey Application November 17, 1950, Serial No. 196,241

20 Claims. (Cl. 222—63)

The present invention relates to weighing apparatus, and more particularly to weighing apparatus of the type adapted to deliver weighed material in the form of a continuous stream.

Scales or weighing machines as heretofore used have usually been constructed to weigh and discharge weighings of material intermittently. Such scales or weighing machines are capable of making weighings of great accuracy, but it is sometimes desired to deliver a continuous stream of material at a substantially constant weight per unit of time. It has been found difficult, however, to maintain accurate feeding of the material in a continuous stream at a desired predetermined weight or rate due primarily to variations in the volume or pressure head of the material supplied to the feeder.

The primary object of the present invention is to provide apparatus for producing a continuous flow of material by weight governed by a scale or weighing machine of the intermittent type, and which avoids the complications of apparatus of this general class as heretofore proposed.

The present invention employs weighing means for intermittently weighing material, such as a scale of the intermittent type, and comprises a reservoir which receives the intermittent weighings of material from the scale and maintains a residue of material therein, and a feeder which discharges the material from the reservoir in a continuous stream, and means governed by the scale or intermittent weighing means for adjusting the feeder to compensate for variations in the flow of material therefrom due to variations in the volume of material supplied to the reservoir, thereby maintaining flow of the material in a continuous stream and at a predetermined weight per unit of time.

To these and other ends, the invention consists in certain improvements and combinations and arrangements of parts, all as will be hereinafter described in detail, the features of novelty being pointed out more particularly in the claims at the end of this specification.

In the accompanying drawings which show the preferred embodiments of the invention.

Similar parts are designated by the same reference numerals in the several views.

The invention is adapted to be used in combination with a scale or weighing machine of the intermittently weighing and discharging type, it being shown for example in combination with an automatic weighing machine of the type shown and described in United States Patents Nos. 962,919, granted June 28, 1910, and 2,497,015, granted February 7, 1950, to which reference may be had for a detailed illustration and description of the construction and operation of such weighing machines. For the purposes of the present invention, it is believed sufficient to describe such a weighing machine generally as comprising a main frame 20 which supports the various elements, a weigh hopper 22 which is suspended from one end of a weigh beam 24 fulcrumed intermediately of its ends on knife edges 26 and counterbalanced at its other end by a weight box 28. The top of the weigh hopper is open, and above it is mounted a feed hopper 30 having a feed gate 32 which is pivoted at 34 to swing into open and closed positions to feed and cut off the feed of material to the weigh hopper. The feed hopper receives the material to be weighed from a bin or equivalent supply means 36, to which the material may be conducted by an elevator or other suitable or well known means.

The feed gate is provided with a toggle comprising a link 40 pivotally connected at one end as at 42 to the frame and pivotally connected at its other end by a pivot 44 to one end of another toggle link 46, the other end of the latter link being provided with a yoke 48 in which operates a pin 50 fixed to the feed gate, the latter being locked in closed position while the links of this toggle are straightened.

The central pivot 44 of the gate toggle is pivotally connected to a drop bar 52 the lower portion of which is pivotally connected to a knock-off lever 54, the latter being pivoted at 56 to the frame and extending beyond an end thereof. The drop bar 52 is controlled by a trigger 58 which is pivoted on the frame at 60 and has a roller 62 thereon on which a shoulder 64 on the drop bar is adapted to rest while the drop bar is in its raised position and holds the toggle in its upwardly flexed condition, thereby holding the feed gate 32 open during the feeding of the dribble stream of material, the weigh beam having a projection 66 thereon which engages and trips the trigger when the weigh beam assumes a balance condition and thereby permits complete closing of the feed gate and locking thereof in closed position by the toggle. The feed gate is opened after the discharge of each weighing from the weigh hopper by a pendant 68 which is pivotally conncted to an arm 70 attached to the feed gate, the lower end of the pendant being engageable by a projection 72 on the weigh hopper end of the weigh beam as this end of the beam rises after the discharge of a weighing from the weigh hopper, and the pendant holds the feed gate open for the feed of the main stream of material to the weigh hopper but descends and thus permits the feed gate to move toward closed position as the weigh hopper descends, thus reducing the stream of material flowing to the weigh hopper to a dribble stream, the feed gate being held in the dribble position by the trigger until the latter is tripped by the weigh beam as it comes to balance.

Figures 1, 4, 5:
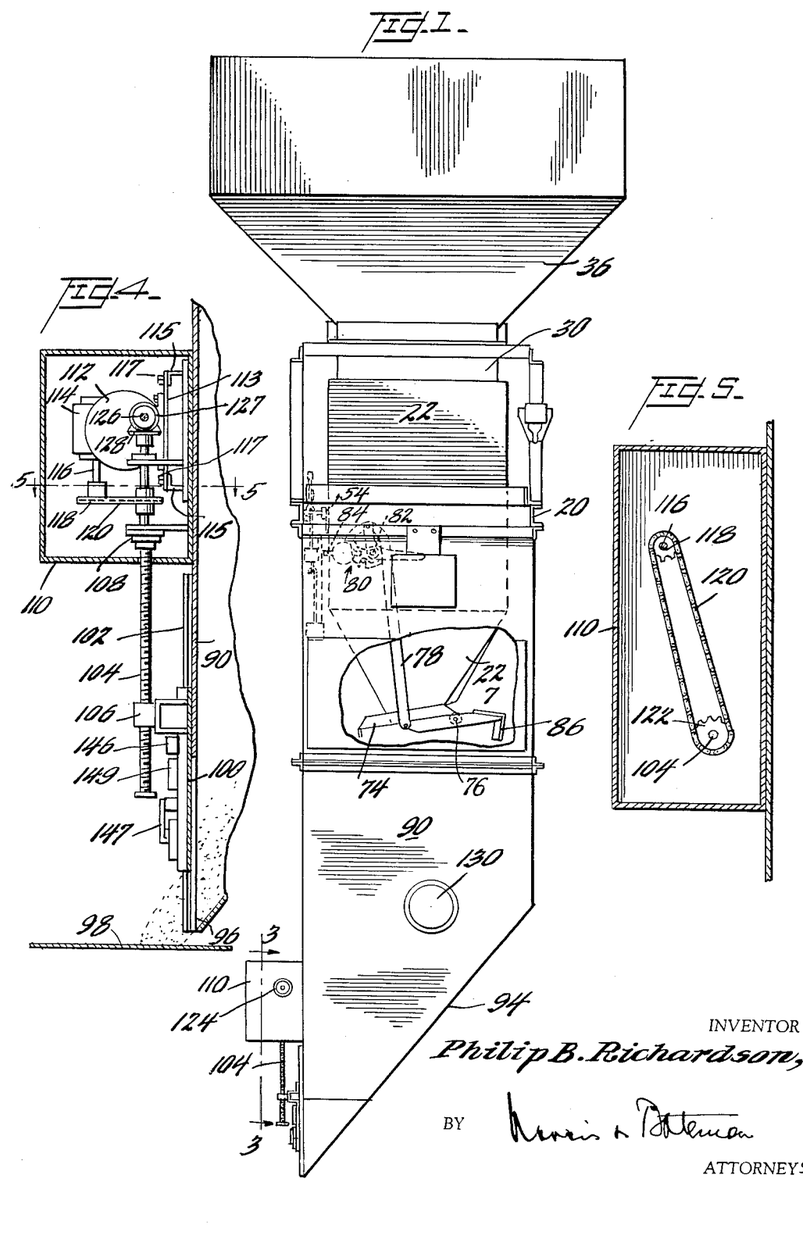
Figure 1 is an elevation of weighing apparatus constructed in accordance with one embodiment of the invention.
Figure 4 is a vertical section, taken on the line 4—4 in Fig. 3.
Figure 5 is a horizontal section taken on the line 5—5 in Fig. 4.
Figure 1A:
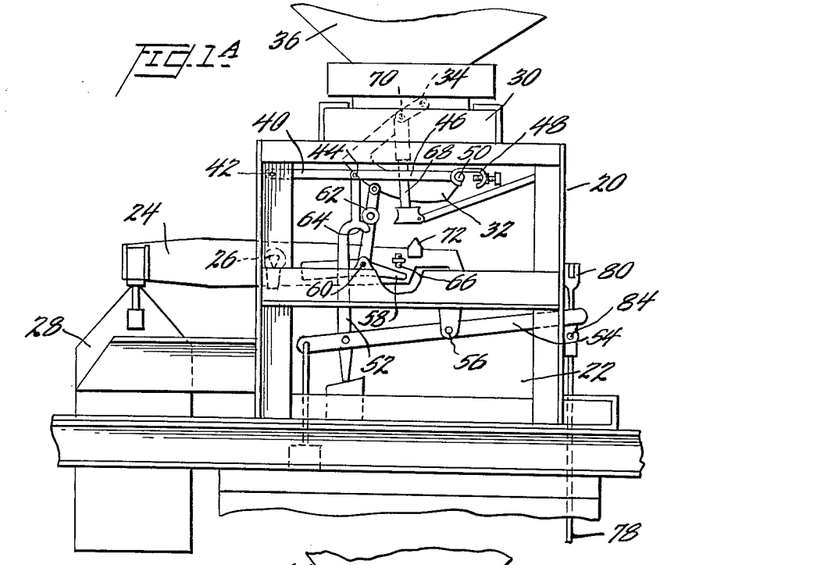
Figure 1A is an elevation of the upper portion of the weighing apparatus shown in Fig. 1 but on an enlarged scale, showing the feed gate for the weigh hopper in closed position.
Figure 1B:
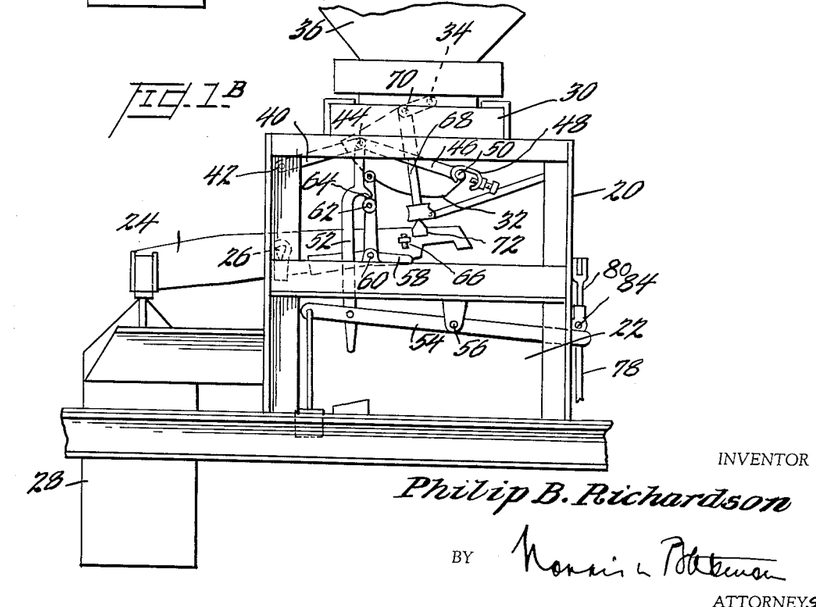
Figure 1B is a view similar to Fig. 1A but showing the feed gate open.
Figures 2, 3:
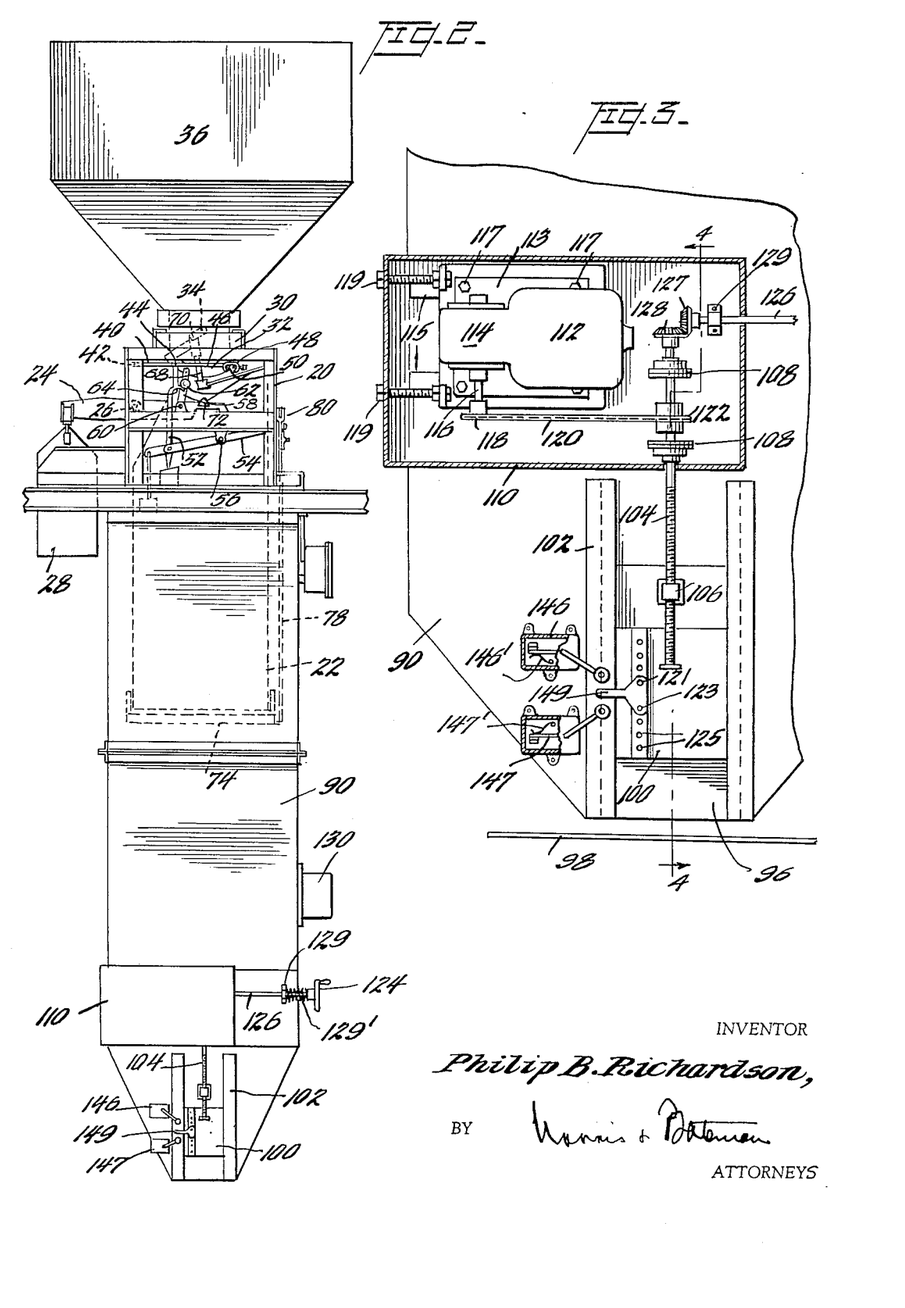
Figure 2 is an elevation of the weighing apparatus shown in Fig. 1 as viewed from the left in that figure.
Figure 3 is a detail vertical section on an enlarged scale, taken on the line 3—3 in Fig. 1.
Figure 6:
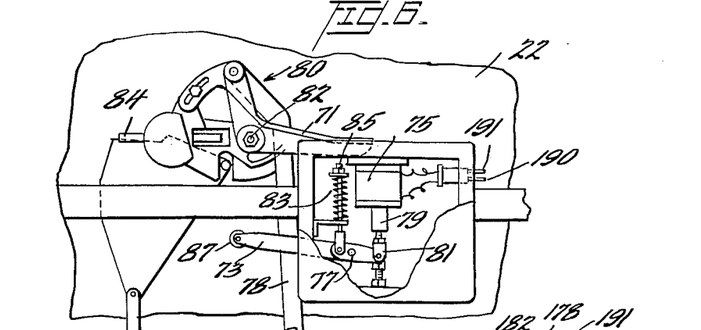
Figure 6 is an elevation of means for controlling the operations of the scale or weighing machine.

The weigh hopper 22 is provided at its lower end with a door 74 which controls the gravity discharge of the weighings of material therefrom, this door being pivoted to the hopper at 76 and being connected by a link 78 to a weight toggle 80 which is pivoted on the weigh hopper at 82 and, while in the position shown in Figs. 1 and 6, locks the hopper discharge door in closed position. The weight toggle carries a pin 84 which, during the feeding of material to the weigh hopper, is above the outer end of the knock-off lever 54. As the weigh hopper descends under the weight of material fed thereto, the trigger 58 trips the bar 52 which drops, thus allowing the feed gate 32 to close completely and thereby cut off the dribble stream and, incident to the complete closing of the feed gate, the outer end of the lever 54 swings upwardly and strikes the pin 84 on the weight toggle, thereby unlocking this toggle and permitting the hopper discharge door to open and discharge the weighing from the weigh hopper. The hopper discharge door is provided with a counterweight 86 which, after discharge of a weighing from the weigh hopper, swings the hopper discharge door into closed position and restores the weight toggle 80 to locked position as shown in Fig. 6, under control, however, of a locking device and cooperating timing device.

The locking device for controlling closing of the hopper discharge door and start of a new weighing, and restoration of the weight toggle to locked condition is preferably of the type shown in Patent No. 2,497,015 hereinbefore referred to, and to which reference may be had for a detailed disclosure of its construction and mode of operation, the locking device in the present instance however, serving to prevent the weighing machine from making a succeeding weighing under the control of the timing device. For the purposes of the present invention, it is believed sufficient to describe the locking device briefly as comprising a tail 71 fixed to the weight toggle 80, a locking lever 73 to cooperate with this tail, and a solenoid 75 which controls the locking lever and in turn is controlled by the timing device, the locking lever being pivoted to the frame at 77 and connected to the core 79 of the solenoid by a link 81. A compression spring 83 acts on a rod 85 connected to the locking lever to bias this lever in a direction to move the roller 87 thereon into the path of swing of the tail 71 on the weight toggle 80.

When the tail 71 engages roller 87 while moving in a clockwise direction, it depresses and passes arm 73, but on its return, roller 87 prevents counter-clockwise movement of the tail 71, but if the solenoid 75 is energized, the roller 87 will be held in lowered position clear of the path of swing of the tail 71 on the weight toggle and the latter swings to the position shown in Fig. 6 to permit closing of the hopper discharge door, that is, the tail 71 will not be obstructed so that it will be free to return to its upper position as shown in Fig. 6 to lock the hopper discharge door. As the weight toggle swings into locked position, the pin 84 thereon strikes the outer end of the lever 54 and swings it in a direction to lift the bar 52 to flex the toggle 40, 46 to unlock the feed gate. After the discharge of a weighing from the weigh hopper, the latter rises, causing the projection 72 thereon to engage and lift the pendant 68 and thereby open the feed gate to initiate the feeding of material to the weigh hopper for the next weighing operation. If, however, the solenoid 75 is not energized, the roller 87 on the locking lever will be in raised position and in the path of swing of the tail 71 on the weight toggle, so that the tail 71 will latch past this roller and become engaged behind it as the weight toggle swings into unlocked position, and the weight toggle will be thereby held from returning to locked position, so that the pin 84 on the weight toggle cannot strike the lever 54 to unlock the feed gate 32 to permit opening thereof to initiate feeding of another weighing to the weigh hopper. Energizing of the solenoid 75 to control the intermittent weighing operations of the weighing machine is controlled by a suitable timing device such as that hereinafter described.

Figure 9:
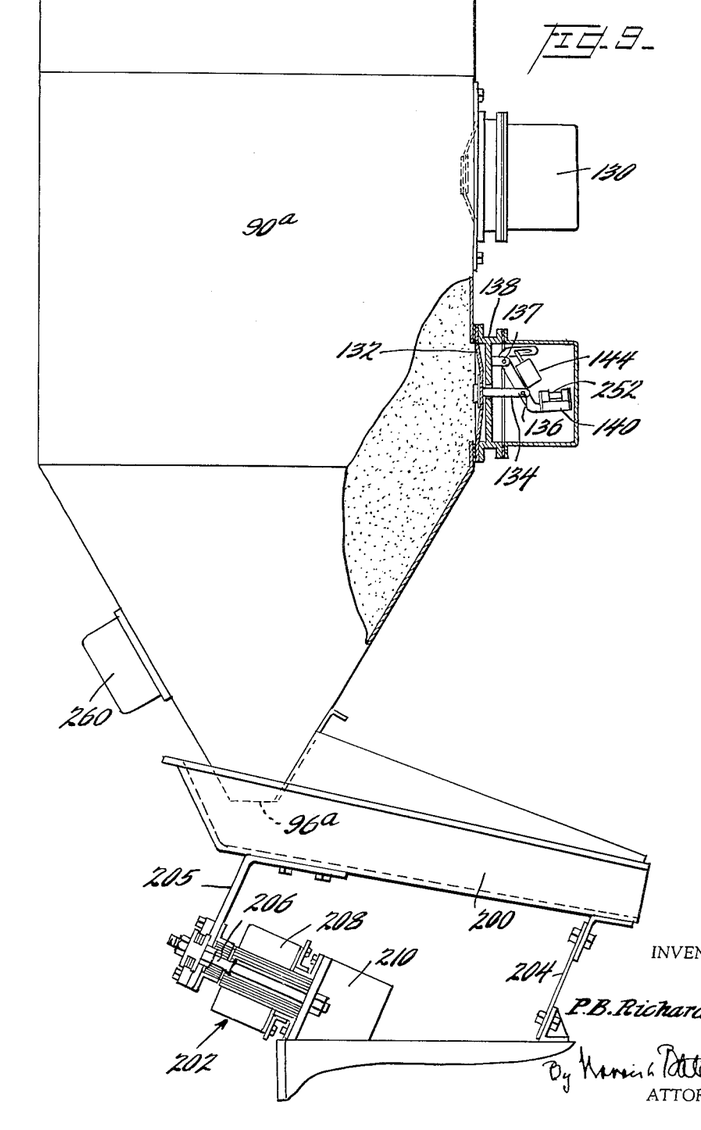
Figure 9 is an elevation, partly in section, of another embodiment of the invention.

According to the present invention, the weighings of material discharged intermittently from the weigh hopper are discharged at predetermined intervals of time and are received successively by a reservoir, the material is discharged in a continuous stream from the reservoir by a feeder, and the rate of discharge of the material by the feeder is adjusted or regulated by means responsive to variations in the height or volume of a residue of material contained in the reservoir, whereby the flow of material under control of the feeder is maintained at a substantially constant predetermined weight per unit of time. Different forms of feeders may be used, Figs. 1 to 5 inclusive showing a feeder in the form of a gate having means for regulating the extent of opening thereof, and Fig. 9 showing a feeder in the form of a vibrator having means for regulating the rate of feed thereof.

Referring first to the embodiment of the invention shown in Figs. 1 and 5 inclusive, 90 is a reservoir, preferably in the form of a hopper, mounted beneath the weigh hopper of the weighing machine to receive the weighings therefrom, one wall 92 of this reservoir being arranged preferably vertically, or substantially so, and another wall 94 thereof sloping toward the lower end of the wall 92 to a discharge opening 96 at the apex, suitable means such as a travelling conveyor 98 being mounted to travel continuously beneath this discharge opening so that it will receive and transport a stream of material discharging continuously from the discharge opening. This discharge opening is controlled by a gate 100 mounted to travel vertically in guides 102 so that the height of the gate will determine the extent of the discharge opening and consequently the rate of flow of material from the reservoir in a given unit of time.

Means is provided for raising and lowering the gate during the flow of material through the discharge opening, such means as shown in the present instance comprising a screw-threaded rod 104 threaded at its lower end in a nut 106 bolted or otherwise fixed to the gate, and journaled at its upper end in bearings 108 mounted on the wall 90 of the reservoir, or a wall of a casing 110 mounted on this wall of the reservoir, the bearings preventing endwise movement of the screw so that rotation thereof will raise or lower the gate.

Suitable means is provided for rotating the screw 104 to effect vertical adjustments of the gate, a reversible electric motor 112 being preferably employed having a speed reduction head 114 the output shaft 116 of which is provided with a sprocket wheel 118 which cooperates with a chain 120, the latter cooperating with a sprocket wheel 122 which is fixed to the screw 104. This motor may be bolted to a plate 113 which is mounted to slide on angle irons 115 fixed to the adjacent wall of the casing 110 and slotted longitudinally to receive bolts 117 for clamping the motor in position after adjustment by screws 119 to apply proper tension to the chain 120. The upward and downward movements of the gate above and below a position for a pre-set normal or mean rate of discharge are controlled by upper and lower limit switches 146 and 147 respectively which are mounted on the wall of the reservoir adjacent to the gate and in positions to be engaged by an arm 149 fixed to the gate. This arm is preferably secured adjustably to the gate, as by screws 121 and 123 engageable in appropriately screw-threaded holes 125 arranged in a vertical series on the gate, in order to enable the gate to be adjusted to provide a normal discharge of different areas to provide for different desired normal or mean rates of discharge. The limit switches are normally closed by springs 146' and 147' respectively and are arranged so that the respective limit switch is opened as the gate approaches the end of its upward or downward movement. An auxiliary manual adjustment is preferably provided for the gate to enable it to be set as described, a hand wheel 124 being shown for this purpose in the present instance which is located exteriorly of the casing 110 and is fixed to a shaft 126 which extends into said casing and carries a bevel gear 127 which may be engaged with a bevel gear 128 on the upper end of the screw 104 by sliding the shaft inwardly in its bearings 129, a coil spring 129' being interposed between one of the bearings and the hand wheel 124 for normally holding the bevel gear 127 out of engagement with the bevel gear 128.

Figures 7, 8:
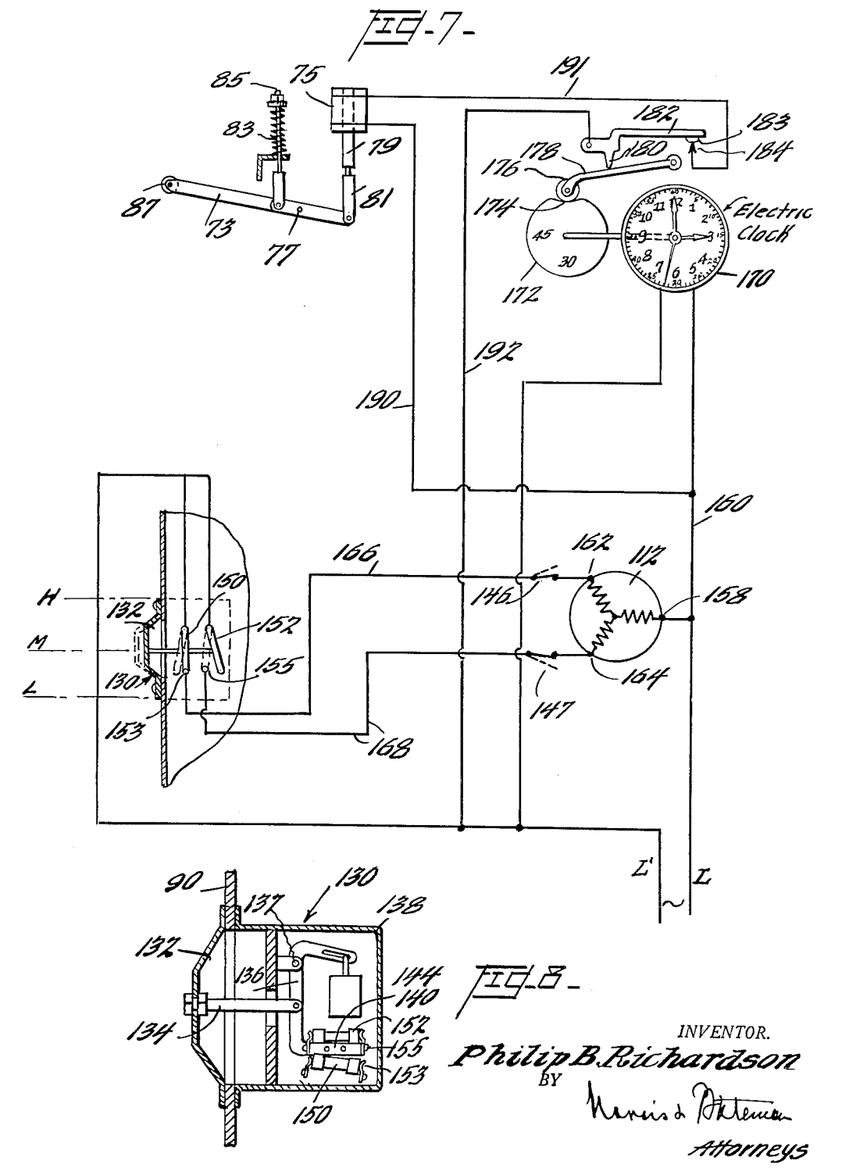
Figure 7 is a diagrammatic view of the electrical circuit for the weighing apparatus shown in Figs. 1 to 6 inclusive.
Figure 8 is a detail vertical section, on an enlarged scale, of a device responsive to variations in the level of the material in the reservoir, employed in the circuit arrangement shown in Fig. 7.

The reversible electric motor 112 is controlled by means responsive to variations in the height or pressure head of the material contained in the reservoir, such means comprising preferably a device of the type shown and described in United States Patent No. 1,951,980, granted March 20, 1934, to which reference may be had for a detailed description of its construction and operation. This device, indicated generally as 130, is mounted in a wall of the reservoir 90 at a suitable height corresponding to the normal or mean level of the material in the reservoir according to the volume of material in each weighment and the frequency at which the weighments are discharged into the reservoir, and the setting of the gate for discharge of the material from the reservoir at a pre-set rate per unit of time. For the purposes of the present invention, this device, a form of which is shown in Fig. 8, may be briefly described as comprising a flexible diaphragm 132 the peripheral edge of which is secured around the edge of an opening in the wall of the reservoir so that it will be subject to the pressure of the head of material contained in the reservoir. The diaphragm is connected by a rod 134 to a lever 136 which is pivoted at 137 on a bracket fixed in a casing 138 which encloses the device, the lever 136 having an arm 140 extending therefrom and carrying in this instance a pair of mercury switches 150 and 152, the switch 150 being positioned to be closed and the switch 152 positioned to be opened by tilting of the arm 140 by the outward movement of the diaphragm 132 under the pressure of the material against it, and the switch 152 being positioned to be closed and the switch 150 opened by inward movement of the diaphragm in the absence of such pressure of the material against it. The arm 136 is loaded by a weight 144 which acts to resist outward displacement of the diaphragm under the pressure of the material, and to move the diaphragm inwardly in the absence of pressure of the material against it.

Fig. 7 is an electrical diagram of a circuit which is preferable for controlling the movements of the gate and the operation of the cooperating elements of the apparatus, it having a device 130 of the construction shown in Fig. 8 connected therein for controlling the operation of the reversible electric motor 112 for adjusting the gate 100 as shown in Figs. 1 to 6 inclusive. The pair of switches 150 and 152 are shown conventionally in this diagram as switch members connected to the flexible diaphragm 132 for operation thereby, and arranged to cooperate respectively with contacts 153 and 155. One terminal 158 of the reversible motor 112 is connected by conductor 160 to one of the line terminals L, and the forward and reverse terminals 162 and 164 are connected respectively by conductors 166 and 168 to switch contacts 153 and 155, through the upper and lower limit switches 146 and 147 which are connected respectively in the conductors 166 and 168.

Means is provided for causing the weighing machine to discharge weighings therefrom at predetermined time intervals, as for example, at a pre-set rate of 30 lbs. per minute. Such means as shown in the present instance comprises a timing device which may be composed of a synchronous electric motor 170 of the type commonly used in electric clocks and operated from an alternating current supplied to the line terminals L and L' and connected by suitable gearing to rotate a cam 172, for example, one revolution per minute. The cam has a notch or depression 174 in its periphery, and a roller 176 on a switch operating arm 178 is arranged to ride on the periphery of the cam. The switch arm is arranged to operate a plunger 180 connected to a switch member 182 carrying a contact 183 engageable with a contact 184 when the roller is in the notch 174. The switch member 182, in each of the embodiments herein shown and described, controls the weighing operations of the weighing machine by controlling the solenoid 75 of the locking device, engaging of the switch member contact 183 with the contact 184, which are connected in the circuit of the solenoid, energizing the solenoid at each revolution of the cam 172, and thereby holding the roller 87 out of the path of the tail 71 on the weight toggle so that the latter may effect the start of a new weighing after discharge of the previous weighing into the reservoir. As shown in Fig. 7, the switch contacts 183 and 184 and the solenoid 75 are connected in series between the line terminals L and L' by conductors 160, 190, 191 and 192, so that engagement of these contacts will complete a circuit to energize the solenoid 75. The cam 172 will engage the contacts at each revolution thereof to initiate operation of the weighing machine to supply a weighing to the reservoir in each minute or other desired predetermined interval of time. The cam 172 is shown in the present instance as having a single notch 174 which will cause operation of the weighing machine at intervals of one minute, but obviously, if two or more operations of the weighing machine per minute or other period of time are desired, such may be provided for by providing two or more notches in the periphery of the cam.

The operation of the embodiment of the invention shown in Figs. 1 to 8 inclusive is as follows: Assuming that the limit switches 146 and 147 are positioned so that the gate can open or close, for example, a distance to increase or decrease the area of its discharge opening about 10 per cent above or below a mean opening of the gate for feeding the material from the reservoir at a pre-set rate per unit of time, depending on the volume of the weighments received by the reservoir and on the frequency as determined by the cam 172 and the gate is set in position to provide such a mean opening and the limit switch operating arm 149 is secured to the gate in a position midway between the upper and lower limit switches, and that a stream of the material is being discharged from the reservoir through the discharge gate opening, as the level of material in the reservoir falls below the device 130 and a mean level substantially as indicated at M in Fig. 7 toward a lower level indicated at L in this figure, due to the discharge of material from the reservoir, the diaphragm 132 of the device 130 will be relieved of the pressure of the material against it and will move inwardly, causing the switch member 150 previously engaged with its contact 153 which caused forward running of the motor 112 and raising of the gate, to be disengaged therefrom and causing the switch member 152 to engage its contact 156, thereby closing a circuit through the conductor 168 and then closed lower limit switch 147 to terminal 164 of the motor to cause reverse running thereof and lowering of the gate, and when the gate reaches its lowered position, the arm 149 thereon opens the lower limit switch 147 and stops the lowering of the gate, preparatory to reception by the reservoir of the next weighing from the weighing machine.

Reception of another weighing of material by the reservoir causes the level of material therein to rise above the device 130 and toward the level substantially as indicated at H in Fig. 7. During this operation, the diaphragm of the device 130 will be pressed outwardly by the pressure of material above it in the reservoir, moving the switch member 150 of this device into engagement with its contact 153 to close a circuit through the conductor 166 and then closed upper limit switch 146 to forward running terminal 162 of the motor 112, causing this motor to run in a direction to raise the gate and thereby increase the area of its discharge opening, so that as the material is fed from the reservoir and its level therein falls, opening movement will be imparted to the gate to progressively increase its discharge opening. When the material in the reservoir falls below the level of the device 130, its diaphragm moves inwardly, and when the gate reaches its lowered position it opens the lower limit switch 147 and the cycle is repeated.

Since as hereinbefore described, the gate is opening to progressively increase the area of its discharge opening while the material is being fed from the reservoir, variations in the height or pressure head of the material are substantially compensated for, and the rate of discharge of the material from the reservoir will be substantially constant, although the weighings of the material are received intermittently from the weighing machine.

The material is discharged by gravity flow from the gate opening in the form of a continuous stream, and by placing a conveyor 98 below this opening and moving it at a constant speed, a strip of material will be deposited on this conveyor at the pre-set rate per unit of time and will have a predetermined weight per unit of length, in accordance with the weighing and discharging of the weighings by the weighing machine as controlled by the timing device.

Figure 10:
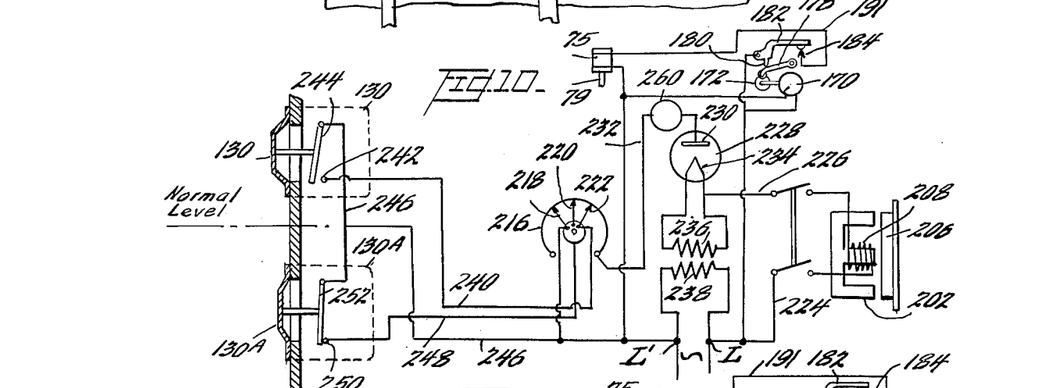
Figure 10 is a diagrammatic view of one form of electrical circuit for the embodiment of the invention shown in Fig. 9.
Figures 11, 12:
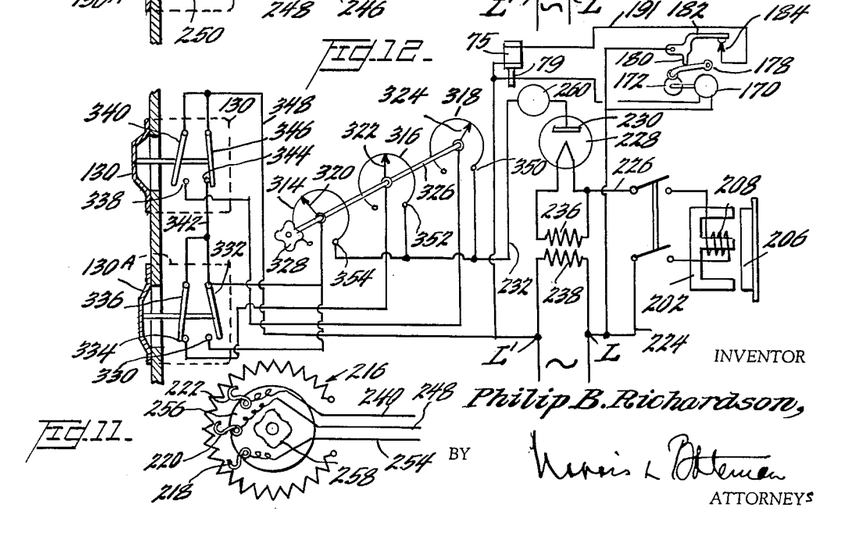
Figure 11 is a detail of the rheostat employed in the circuit shown in Fig. 10.
Figure 12 is a diagrammatic view of another form of electrical circuit for the embodiment shown in Fig. 9.

Fig. 9 shows another embodiment of the invention, and Figs. 10 and 12 show circuits therefor, in which weighings from the weighing machine are discharged intermittently into a reservoir at preset intervals under the control of the timing device, but high level and low level devices responsive to variations in the level of material in the reservoir are employed to control or regulate the rate of feed material from the reservoir. In this embodiment, the weighings of material from the weighing machine are discharged intermittently under control of the cam 172 and switch member 182 into a reservoir 90a having a high level device 130 and a low level device 130A mounted in a wall thereof at different heights to operate in response to pressure or absence of pressure of the material thereon due to variations of level of material in this reservoir, and the material is discharged from the reservoir through a discharge opening 96a into a vibratory feeder comprising a trough 200 which is separate from and movable relatively to the reservoir 90a and is vibrated by an electro-magnet 202, and may discharge the material onto a continuously travelling conveyor.

The trough 200 is located immediately below the discharge opening 96a of the reservoir so that it will control the discharge of material from this opening, and it is preferably sloped downwardly from its receiving to its delivery end, as shown, this trough being mounted toward one end upon a flexible member or leaf spring 204 and having a rigid actuating arm 205 fixed to its other end, this arm being fixed to an armature 206 which cooperates with the poles of the core of an electro-magnet having a coil 208, the core of the magnet being fixed to a bracket 210 which is fixed rigidly to a stationary base 212. The construction and operation of this magnet may be as shown and described in United States Patent No. 2,187,717, granted January 23, 1940, to which reference may be had for a more detailed disclosure thereof, it being believed sufficient for the purposes of the present invention to explain that electric impulses applied to the coil of this magnet will set up vibration which is transmitted to the trough 200 to feed material from the discharge opening 96a of the reservoir, and that variation of the amplitude of vibration imparted to the trough by the electro-magnet will vary the rate of feed of material from the reservoir.

The present invention provides means for varying the amplitude of vibration imparted to the feeder trough and consequently the rate of feed of material from the reservoir under control of the level of material in the reservoir, two alternative arrangements for this purpose being shown in Figs. 10 and 12.

In the arrangement shown in Figs. 10 and 11, a single rheostat 216 having a set of three contacts 218, 220 and 222 respectively is employed for controlling the rate of feed of material from the reservoir according to the height of material therein, these contacts being in circuit with high level and low level devices 130 and 130A similar to the device shown in Fig. 8 but each having a single switch member, and being operative to insert different amounts of resistance of the rheostat into the operating circuit for the electro-magnet 202 which vibrates the feeder. As shown in Fig. 10, one terminal L of a source of alternating current is connected by a conductor 224 to one terminal of the coil 208 of the electro-magnet and the other terminal of this coil is connected by a conductor 226 to the cathode of a diode rectifier 228 the anode 230 of which is connected by a conductor 232 to one terminal of the rheostat 216. The cathode 234 of the diode may be of the heater type having a heater 236 which is energized by a coil 238 connected across the line terminals L and L'. The contact 222 which includes a relatively small part of the resistance of the rheostat in the circuit is connected by a conductor 240 to a contact 242 of the upper or high level device 130 for engagement with the switch member 244, the latter being connected by a conductor 246 to the line terminal L'; the contact 220 of the rheostat which inserts a relatively greater amount of the resistance in circuit is connected by a conductor 248 to a contact 250 of the low level device 130A the switch member 252 of which is connected to the conductor 246 leading to the line terminal L'; and the contact 218 of the rheostat which inserts the greatest amount of resistance in circuit is connected by the conductor 254 directly to the line terminal L'.

Fig. 10 shows the condition of the circuit while the vibrator is feeding material from the reservoir while the material is at a normal level therein, that is, between the devices 130 and 130A, the switch member 244 of the upper level device 130 then being open and the switch member 252 of the low level device being closed. The operating current for the electro-magnet 202 will then be supplied from the line terminal L through conductor 224, electro-magnet coil 208, conductor 226, diode 228, conductor 232, rheostat 216, normal contact 220, contact 250, and switch member 252 of low level device 130A and by conductor 246 to line terminal L'. Some current will also flow from the rheostat through contact 218 direct to line terminal L', but the current will flow mainly through contact 250 which inserts less resistance in the circuit.

If the vibrator is feeding the material too fast from the reservoir, the residue of material therein will drop to a level below the low level device 130A, causing its diaphragm to move inwardly and to thereby disengage its switch 252 from its contact 250, thereby opening the circuit through the rheostat contact 220, and the electro-magnet of the vibrator will then be energized with less current through the rheostat contact 218 which cuts a greater amount of resistance into the electro-magnet circuit, thereby reducing the rate of feed of the material by the feeder; and if the feeder is feeding the material from the reservoir too slowly so that the residue of material therein rises above the upper level device 130, the diaphragm of this device will be pushed outwardly, closing the switch member 244 with the contact 242, and the electro-magnet of the feeder will then be energized with a greater amount of current through the rheostat and rheostat contact 222, conductor 240, contact 242, switch member 244 and conductor 246 to line terminal L', the less amount of resistance of the rheostat then in the circuit causing the vibrator to feed the material from the reservoir more rapidly. When the level of material in the reservoir has been restored from below the low level device 130A or above the high level device 130 to a normal level between these devices, the circuit will be restored to the condition shown in Fig. 10, and the feeder will then operate to feed the material from the reservoir at a normal rate under control of the rheostat contact 220.

In this embodiment of the invention, the weighings of material are discharged intermittently by the weighing machine into the reservoir under control of the switch member 182 controlled by the timer cam 172 and solenoid 75, so that the upper and lower level devices may control the level of material in the reservoir at all times, but a residue of material remains in the reservoir between the intermittent discharges of the weighings into the reservoir.

The rheostat contacts 218, 220 and 222 are preferably all carried by a rotor 256 which is mounted rotatably concentrically of the rheostat and provided with a knob 258 for rotating it, so that all of these contacts may be adjusted simultaneously to increase or decrease the amount of resistance in the operating circuit of the vibrator and thereby vary the rate of feed of material from the reservoir. For example, if it is desired to increase the weight of the weighings by the weighing machine, or to discharge the weighings therefrom at shorter intervals into the reservoir and thus increase the output, the feeder may be speeded up accordingly by rotating the contacts around the rheostat in a direction to reduce the amount of resistance in the circuit of each contact, thereby increasing the operating current supplied to the electro-magnet of the vibrator and thereby increasing the rate of feed by the feeder, and if it is desired to discharge weighings of less weight into the reservoir or to discharge the weighings therein at less frequent intervals, the rheostat contacts may be rotated around the rheostat in the opposite direction, thus inserting greater amounts of resistance in the circuits controlled by the rheostat contacts and reducing the operating current supplied to the electromagnet of the feeder, and thereby reducing the rate of feed of material from the reservoir by the feeder.

If desired or found necessary, a vibrator 260 may be mounted on a wall of the reservoir to agitate the material therein and thereby maintain it in a flowing condition, it being connected for example in series with the conductor 232 in the circuit arrangement shown in Fig. 10, and such a vibrator may be used in the circuit arrangement shown in Fig. 12, such vibrator operating continuously during the operation of the feeder.

The circuit arrangement shown in Fig. 12 is similar to that shown in Fig. 10, except that it employs individual rheostats for providing the different rates of feed by the feeder, and the high and low level devices have double switch members as shown in Fig. 8. In this arrangement, a set of rheostats 314, 316 and 318 are provided to provide slow, normal and fast feed respectively by the vibratory feeder, these rheostats being provided respectively with contact arms 320, 322 and 324 which are fixed at different appropriate angles to a shaft 326 having a knob 328 for rotating it whereby the contact arms may be adjusted around the respective rheostats to vary the resistances in the circuits in which the contact arms are connected, and double switches are employed in the high level and low level devices 130 and 130A. The slow feed contact 320 is connected to a contact 330 controlled by a switch member 332, and the normal feed contact arm 322 is connected to a contact 334 controlled by a switch member 336 of the low level device 130A, and the fast feed contact arm 324 is connected to a contact 338 controlled by a switch member 340 of the high level device 130. The switch members 332 and 336 of the low level device 130A are connected by a conductor 342 to a contact 344 which is adapted to be engaged by a switch member 346 of the high level device 130, and the switch members 340 and 346 of the high level device 130 are connected by a conductor 348 to the line terminal L'. In this arrangement, the conductor 232 leading from the anode 239 of the diode or rectifier 228 is connected to the terminals 350, 352 and 354 respectively of the rheostats.

Fig. 12 shows the condition of the circuit while the material in the reservoir is at a normal level between the high level and low level devices 130 and 130A and the feeder is feeding the material from the reservoir at a normal rate according to the setting of the rheostats. The vibrator of the feeder will then be energized from the line terminal L through the vibrator 208 and the diode or rectifier 228, thence by conductor 232 to terminal 252 of the rheostat 316, rheostat arm 322, contact 334 and switch member 336 of low level device 130A which are then engaged, conductor 342, contact 344 and switch member 346 of high level device 130 which are then engaged, and conductor 348 to line terminal L'.

If the feeder is feeding the material too slowly and the level of the material in the reservoir rises above the high level device 130, the diaphragm of this device is pushed outwardly, disengaging switch member 346 from contact 344 and engaging switch member 340 with contact 338. The energizing current for the vibrator 202 of the feeder will then flow from conductor 232 to terminal 350 of rheostat 318 and through this rheostat and its contact arm 324 to contact 338 and switch member 340 of high level device 130 which are then closed, and by conductor 348 to line terminal L', and the feeder will then feed more rapidly.

If the feeder is feeding the material from the reservoir too fast and the level of the material therein falls below the low level device 130A, the diaphragm of this device will move inwardly, thereby closing a circuit through switch member 332 and contact 330 and disengaging switch member 336 from contact 334. The energizing current for the vibrator 202 will then flow from conductor 232 to terminal 354 of rheostat 314 and contact arm 320 thereof, thereby inserting greater resistance in the circuit, the current passing from the contact arm 320 to contact 330 and switch member 332 which are then closed, conductor 342, through then closed contact 344 and switch member 346 of high level device 130, and by conductor 348 to line terminal L', and the feeder will then operate more slowly.

In the arrangement employing a vibratory feeder as shown in Fig. 9 and a circuit arrangement as shown in Fig. 10 or Fig. 12, the vibratory feeder operates continuously to feed a continuous stream of material from the reservoir while the apparatus is in operation, during which regulation of the speed of the feeder takes place as may be necessary to effect feed of the material at a predetermined pre-set rate.

The high level device 130 may be placed at different appropriate heights to determine the high level for the material in the reservoir for weighments of different volumes to be introduced into the reservoir. For example, the weighing machine may be set, by placing an appropriate weight in the weight box 28, to make weighings of for example 50 lbs., and the timing cam 172 may be set to discharge such weighings at the rate of one weighing per minute, and the high level device 130 may be placed at an appropriate level accordingly. However, if it is desired to make weighings of less weight, as for example, 20 or 30 lbs. per weighing, the weight placed in the weight box 28 may be selected accordingly, and the high level device 130 placed at an appropriately lower level. The timing cam 172 may be operated to discharge a weighing from the weighing machine into the reservoir once each 60 seconds, or this cam may be provided with a pair of diametrically opposite notches so that the weighing machine will discharge a weighing into the reservoir once each 30 seconds, thus increasing the output of the apparatus.

The range of speed of feed by the feed gate 100 in Figs. 1 to 7 inclusive may be manually set by operation of the hand wheel 124 which rotates the screw to set the height of the gate and by setting the limit switch operating arm accordingly, and the range of speed of the vibrator feeder shown in Figs. 9 to 12 inclusive may be varied by adjusting the rheostat 216 or the rheostats 314, 316 and 318 by rotating the knob 253 or 323 respectively.

The present invention provides weighing apparatus which enables fluent or free-flowing materials of various kinds to be weighed by a scale or weighing machine of the intermittent type and fed in a continuous stream at a pre-set rate per unit of time.

In each embodiment of the invention as herein shown and described, a predetermined weight of material is supplied at pre-set intervals of time to the reservoir to provide a residue of material therein which supplies the feeder, and the level of the material in the reservoir is maintained between sufficiently close limits and is fed therefrom under such conditions that the rate of feed by the feeder will be substantially constant.

The means responsive to the height of material in the reservoir to automatically maintain a residue of material therein avoids an excess or deficiency of material to supply the feeder, and accumulating error is avoided.

I claim:

1. In weighing apparatus, the combination of means for weighing material intermittently and discharging weighings thereof at equal predetermined time intervals, a reservoir arranged to receive successively the weighings of material from said weighing means, a feeder capable of discharging material from the reservoir at a variable rate and in a continuous stream, and means responsive to variations in the volume of material contained in the reservoir for adjusting the feeder to regulate the rate of discharge of the continuous stream of material therefrom and to maintain a residue of material in the reservoir.

2. In weighing apparatus, the combination of means for weighing material intermittently and discharging weighings thereof at equal predetermined time intervals, a reservoir positioned to receive successively the weighings of material from the weighing means, a feeder adjustable to discharge the material from the reservoir in a continuous stream and at a variable rate of flow, and means responsive to variations in the pressure head of material in the reservoir for adjusting the feeder to maintain a continuous flow of the material at a substantially uniform weight per unit of time and at a rate to maintain a residue of material in the reservoir.

3. In weighing apparatus, the combination of means for weighing material intermittently and discharging weighings thereof at equal predetermined time intervals, a reservoir to receive successively the weighings of material from the weighing means, a feeder for discharging the material from the reservoir in a continuous stream, the feeder having means for varying the rate of discharge of the material, and controlling means responsive to variations in the height of material in the reservoir and cooperative with said means for increasing or decreasing the rate of discharge of material by the feeder while the level of material in the reservoir is above or below respectively a predetermined level.

4. In weighing apparatus, the combination of a weighing machine for making weighings of material intermittently, timing means for effecting discharges of weighings from the weighing machine at successive predetermined time intervals, a reservoir arranged to receive successively the weighings from the weighing machine, a feeder for discharging material from the reservoir in a continuous stream, means cooperative with the feeder for regulating the rate of discharge of the stream, and means responsive to variations in the height of material in the reservoir and cooperative with the regulating means for maintaining discharge of the stream of material at a substantially constant predetermined weight per unit of time and at a rate relatively to the volume and frequency of reception of the weighings by the reservoir to maintain a residue of material in the reservoir.

5. In weighing apparatus, the combination of a weighing machine for making weighings of material intermittently, timing means for effecting successive discharges of the weighings at predetermined time intervals, a reservoir arranged to receive successively the weighings from the weighing machine, a feeder for removing material in a continuous stream from the reservoir, and means including devices responsive respectively to the head of material at different levels in the reservoir for regulating the rate at which the feeder removes material from the reservoir relatively to the volume and frequency of reception of the weighings by the reservoir to maintain a residue of material in the reservoir.

6. In weighing apparatus, the combination of a weighing machine for making weighings of material intermittently, timing means for effecting successive discharges of the weighings at predetermined time intervals, a reservoir to receive successive weighings from the weighing machine, a feeder operative to remove material in a continuous stream from the reservoir, a device responsive to pressure of material at different levels in the reservior, and means controlled by said device for regulating the rate at which the feeder removes material from the reservoir relatively to the timing means and to the volume of the weighings received by the reservoir to maintain a residue of material in the reservoir.

7. In weighing apparatus, the combination of means for making weighings of material intermittently, timing means cooperative with the weighing means for effecting discharges of weighings therefrom at successive pre-set time intervals, a reservoir positioned to receive successively the weighings from the weighing means, a feeder for discharging material from the reservoir in a continuous stream, electrical regulating means cooperative with the feeder for varying the rate of discharge of material thereby, and means including an element reponsive to pressure of material in the reservoir at different levels and electrical switch means operative by said element for setting the regulating means relatively to said timing means to increase or decrease the rate of discharge of material from the reservoir while the pressure of material therein is above or below respectively a predetermined value and to maintain a residue of material in the reservoir.

8. In weighing apparatus, the combination of means for making weighings of material intermittently, timing means cooperative with the weighing means for effecting discharges of weighings therefrom at successive equal pre-set time intervals, a reservoir arranged to receive the weighings successively, a feeder for discharging material from the reservoir at a variable rate and in a continuous stream, means including a reversible electric motor connected to the feeder for varying the rate of discharge of material thereby, and means including an element responsive to variations in the volume of material contained in the reservoir at different levels, and electrical switch means operative by said element and connected to said motor for controlling its operation to adjust the feeder to increase or decrease and thereby regulate the rate of discharge of the continuous stream of material from the reservoir and to maintain a residue of material in the reservoir.

9. In weighing apparatus, the combination of means for making weighings of material intermittently, timing means cooperative with the weighing means for effecting discharges of weighings therefrom at equal predetermined time intervals, a reservoir to receive the weighings successively from said weighing means, a gate for feeding material from the reservoir in a continuous stream and adjustable to vary the rate of such feed, and means responsive to variations in the volume of material contained in the reservoir for adjusting the gate and thereby regulate the rate of feed of the continuous stream of material from the reservoir and to maintain a residue of material in the reservoir.

10. In weighing apparatus, the combination of means for making weighings of material intermittently, timing means for effecting discharges of weighings from the weighing means at successive equal preset time intervals, a reservoir arranged to receive the weighings successively from said weighing means, a gate capable of feeding material from the reservoir at a variable rate and in a continuous stream and adjustable to vary the rate of feed of the continuous stream of material from the reservoir, electrical means for adjusting the gate, and means responsive to variations in the volume of material contained in the reservoir for controlling said gate adjusting means to adjust the gate to regulate the rate of feed of the continuous stream of material from the reservoir and to maintain a residue of material in the reservoir.

11. In weighing apparatus, the combination of means for making weighings of material intermittently, timing means for effecting discharges of weighings from the weighing means at successive equal pre-set time intervals, a reservoir arranged to receive the weighings successively from said weighing means, a gate capable of feeding material from the reservoir at a variable rate and in a continuous stream, means including a reversible electric motor for adjusting the gate, and means including switch means responsive to variations in the volume of material contained in the reservoir for controlling said motor to adjust the gate to regulate the rate of discharge of the continuous stream of material from the reservoir and to maintain a residue of material in the reservoir.

12. In weighing apparatus, the combination of means for weighing material intermittently and discharging the weighings thereof at equal predetermined time intervals, a reservoir arranged to receive successively the weighings from the weighing means, a gate capable of feeding material from the reservoir at a variable rate and in a continuous stream and adjustable to vary the area of its feed opening, means for adjusting the gate to vary the area of its feed opening, means including devices responsive to variations in the volume of material contained in the reservoir for controlling the gate adjusting means to adjust the gate to regulate the rate of feed of the continuous stream of material from the reservoir and to maintain a residue of material in the reservoir, and means for limiting the extent of adjustment of the gate.

13. In weighing apparatus, the combination of means for weighing material intermittently and discharging weighings therefrom at equal predetermined time intervals, a reservoir arranged to receive successively the weighings from the weighing means, a gate adjustable to feed material from the reservoir at a variable rate and in a continuous stream, means for adjusting the gate to vary the rate of feed of the continuous stream of material from the reservoir, means including electrical switch means responsive to variations in the volume of material contained in the reservoir at relatively different levels for adjusting the gate to vary the rate of feed of the continuous stream of material from the reservoir and to maintain a residue of material in the reservoir, and limit switches controlled by the gate for limiting the extents of adjustment thereof.

14. In weighing apparatus, the combination of means for weighing material intermittently and discharging the weighings, timing means for controlling discharges of weighings from the weighing means at equal predetermined intervals of time, a reservoir arranged to receive successively the weighings from the weighing means, a gate capable of feeding material from the reservoir at a variable rate and in a continuous stream, means including a reversible electric motor for adjusting the gate to vary the area of its feed opening, means including a device responsive to variations in the volume of material contained in the reservoir and circuits for said device for causing operation of said motor in a direction to adjust the gate to reduce the area of its feed opening while the material in the reservoir is at a relatively high level and to cause operation of said motor in the opposite direction to adjust the gate to increase the area of its feed opening while the level of material in the reservoir is falling to a relatively lower level and thereby regulate the rate of feed of the continuous stream of material from the reservoir and to maintain a residue of material in the reservoir.

15. In weighing apparatus, the combination of means for weighing intermittently constant amounts of material and discharging weighings thereof at predetermined constant time intervals, a reservoir arranged to receive the weighings successively and having an opening for the discharge of material therefrom, a feeder mounted below the discharge opening of the reservoir, means for vibrating the feeder to effect discharge of material in a continuous stream from the reservoir, and means including devices responsive to variations in the volume of material in the reservoir and cooperative with said vibrating means for varying the vibration of the feeder and thereby vary the rate of discharge of material from the reservoir.

16. In weighing apparatus, the combination of means for weighing intermittently constant amounts of material and discharging weighings thereof at predetermined constant time intervals, a reservoir arranged to receive the weighings successively and having an opening for the discharge of material therefrom, a feeder mounted to cooperate with the discharge opening of the reservoir to remove material therefrom, electro-magnetic means for vibrating the feeder to effect discharge of material in a continuous stream from the discharge opening of the reservoir, and means including electrical switch means responsive to variations in the level of material in the reservoir and cooperative with said electro-magnetic means for varying the vibration of the feeder and thereby vary the rate of discharge of material from the reservoir.

17. In weighing apparatus, the combination of means for weighing intermittently constant amounts of material, timing means for effecting discharge of weighings from the weighing means at predetermined constant time intervals, a reservoir positioned to receive the weighings successively from the weighing means, a feeder for removing material from the reservoir, means for vibrating the feeder to effect discharge of material from the reservoir in a continuous stream, and means including devices responsive to variations in the volume of material in the reservoir and cooperative with said vibrating means for varying the vibration of the feeder and thereby vary the rate of discharge of material from the reservoir.

18. In weighing apparatus, the combination of means for weighing intermittently constant amounts of material and discharging weighings therefrom at predetermined constant time intervals, a reservoir arranged to receive the weighings successively and having an opening for the discharge of material therefrom, a feeder mounted to cooperate with said discharge opening of the reservoir, electro-magnetic means for vibrating the feeder to effect discharge of material in a continuous stream from the reservoir, and means including electrical switches connected to said electro-magnetic means for varying the intensity of operation thereof, and devices responsive to the pressure of material at relatively different levels in the reservoir and connected to said switches to operate them to vary the intensity of vibration of the feeder and thereby vary the rate of discharge of material from the reservoir.

19. In weighing apparatus, the combination of weighing means for intermittently making weighings of constant amounts of material and discharging weighings therefrom, timing means for effecting discharges of weighings at equal pre-set time intervals, a reservoir arranged to receive the weighings successively, a feeder for discharging material from the reservoir in a continuous stream, means cooperative with the feeder for regulating the rate of discharge of the stream from the reservoir, and means responsive to variations in the height of material in the reservoir for controlling the feeder regulating means relatively to said timing means to increase or decrease the rate of discharge of material from the reservoir while the material therein is above or below respectively a predetermined height and thereby maintain a substantially constant rate of discharge of material from the reservoir and to maintain a residue of material in the reservoir.

20. In weighing apparatus, the combination of weighing means for intermittently making weighings of constant amounts of material and discharging weighings therefrom, electrical timing means cooperative with the weighing means for effecting discharges of weighings therefrom at equal pre-set time intervals, a reservoir arranged to receive the weighings successively, a feeder for discharging material from the reservoir in a continuous stream, electrical means cooperative with the feeder for regulating the rate of discharge of the stream from the reservoir relatively to the timing means to maintain a residue of material in the reservoir, and means including electrical switch means responsive to relatively different levels of material in the reservoir and having circuits for connecting them to the feeder regulating means to increase or decrease the rate of discharge of material from the reservoir while the material therein is above or below respectively a predetermined level in the reservoir.

References Cited in the file of this patent

UNITED STATES PATENTS

| | | |
|---|---|---|
| Re. 13,975 | Templeton | Aug. 31, 1915 |
| 442,716 | Richards | Dec. 16, 1890 |
| 962,919 | Richardson | June 28, 1910 |
| 1,685,512 | Varusky | Sept. 25, 1928 |
| 1,951,980 | Jacobson | Mar. 30, 1934 |
| 2,097,522 | Hanique | Nov. 2, 1937 |
| 2,187,717 | Weyyandt | Jan. 23, 1940 |
| 2,276,383 | Francis | Mar. 17, 1942 |
| 2,277,879 | Ness et al. | Mar. 31, 1942 |
| 2,327,282 | McComb | Aug. 17, 1943 |
| 2,376,304 | Anderson | May 15, 1945 |
| 2,381,505 | Lindholm | Aug. 7, 1945 |
| 2,475,404 | Reed | July 5, 1949 |
| 2,497,015 | Richardson | Feb. 7, 1950 |
| 2,507,255 | Kaufman | May 9, 1950 |
| 2,568,379 | Berg | Sept. 18, 1951 |
| 2,646,900 | Sisco | July 28, 1953 |

FOREIGN PATENTS

| | | |
|---|---|---|
| 403,936 | Great Britain | of 1934 |